United States Patent
Izradel

(10) Patent No.: US 10,451,233 B1
(45) Date of Patent: Oct. 22, 2019

(54) OUTDOOR LIGHT POLE WITH SOLAR PANEL ARRAY

(71) Applicant: Gama Sonic USA, Inc., Atlanta, GA (US)

(72) Inventor: Lazar Izradel, Tel Aviv (IL)

(73) Assignee: Gama Sonic USA, Inc., Norcross, GA (US)

( * ) Notice: Subject to any disclaimer, the term of this patent is extended or adjusted under 35 U.S.C. 154(b) by 0 days.

(21) Appl. No.: 16/031,191

(22) Filed: Jul. 10, 2018

(51) Int. Cl.
| | |
|---|---|
| *F21L 4/00* | (2006.01) |
| *F21S 9/03* | (2006.01) |
| *F21V 23/00* | (2015.01) |
| *F21S 8/08* | (2006.01) |
| *H02S 40/36* | (2014.01) |
| *H02S 40/38* | (2014.01) |
| *H02S 20/20* | (2014.01) |
| *F21W 131/10* | (2006.01) |

(52) U.S. Cl.
CPC .............. *F21S 9/035* (2013.01); *F21S 8/088* (2013.01); *F21V 23/002* (2013.01); *H02S 20/20* (2014.12); *H02S 40/36* (2014.12); *H02S 40/38* (2014.12); *F21W 2131/10* (2013.01)

(58) Field of Classification Search
CPC .......... H02S 20/10; H02S 20/20; H02S 40/36; H02S 40/38; F21S 9/035
USPC ........................................................ 362/190
See application file for complete search history.

(56) References Cited

U.S. PATENT DOCUMENTS

| | | | | |
|---|---|---|---|---|
| 3,705,300 A | * | 12/1972 | Plemmons | F21S 8/088 362/218 |
| 4,281,369 A | * | 7/1981 | Batte | F21S 8/086 136/291 |
| 5,928,437 A | * | 7/1999 | Dillard | B64G 1/443 136/244 |
| 9,046,235 B2 | * | 6/2015 | Wilson | F21S 9/035 |
| 2009/0001816 A1 | * | 1/2009 | Tarter | H01M 2/1055 307/65 |
| 2012/0020060 A1 | * | 1/2012 | Myer | F21S 2/00 362/183 |
| 2013/0141902 A1 | * | 6/2013 | Akdag | F21S 8/086 362/191 |
| 2014/0153226 A1 | * | 6/2014 | Hoang | F03D 9/00 362/183 |
| 2015/0162867 A1 | * | 6/2015 | Meringer | H02S 20/20 362/183 |

* cited by examiner

*Primary Examiner* — Matthew J. Peerce
(74) *Attorney, Agent, or Firm* — Dekel Patent Ltd.; David Klein

(57) ABSTRACT

A solar energy device includes an outdoor pole with a solar panel array including a plurality of solar panels mounted around a periphery of the pole, wires electrically connecting the solar sub-panels and connecting the solar panels, a base on which the pole is mounted, and a battery mounting module removably inserted in the base. The battery mounting module includes a cradle for receiving therein one or more batteries.

8 Claims, 2 Drawing Sheets

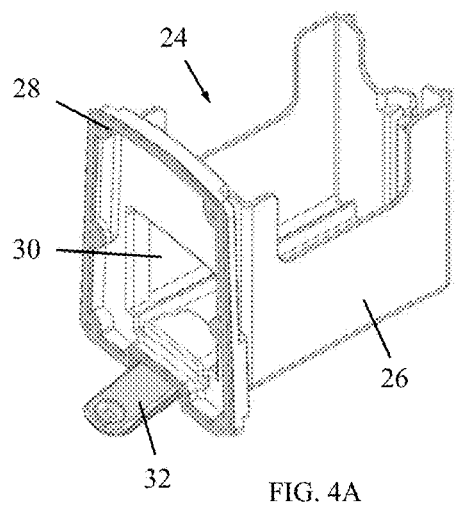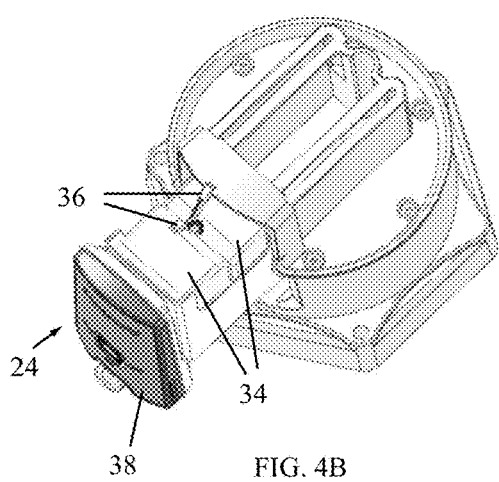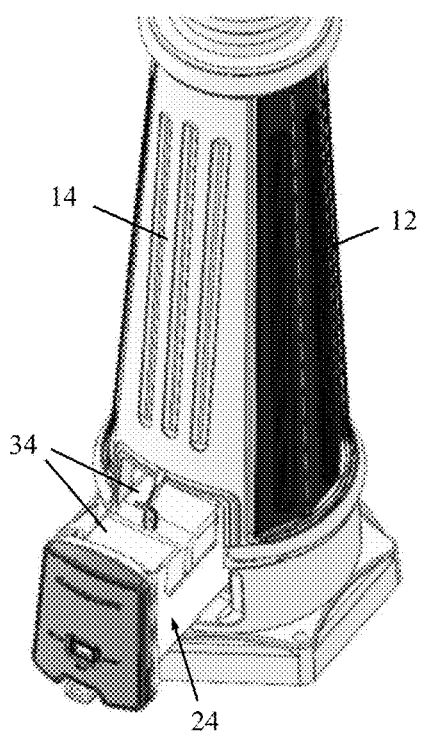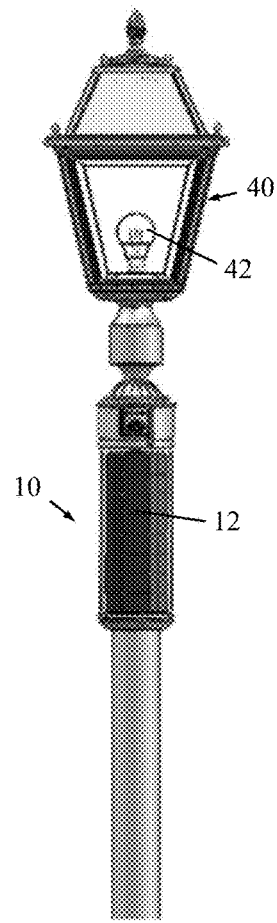

OUTDOOR LIGHT POLE WITH SOLAR PANEL ARRAY

FIELD OF THE INVENTION

The present invention relates generally to solar lighting and particularly to an outdoor light pole with a solar panel array.

BACKGROUND OF THE INVENTION

Outdoor lamps are known, such as for streets or gardens, which are electrically connected to AC mains. Incandescent light bulbs are used for such outdoor lamps, but are disadvantageous. One reason is that incandescent light bulbs draw significant power, and since the lamp must work all night, the light bulb may not provide enough light towards the end of the night. The lifetime of the bulb is also shortened. Even fluorescent or halogen lights which draw less power have a short lifetime.

Solar outdoor lighting is also known. Such lighting generally has a flat solar panel array directed towards the sun rays for storing energy in batteries, which are used to provide DC electricity to power light emitting diodes (LEDs). LEDs have substantially higher light conversion efficiencies than incandescent and halogen lamps and longer lifetimes than all three of the abovementioned types of conventional light sources. Some LEDs have higher conversion efficiencies than fluorescent light sources. LEDs require lower voltages than fluorescent lamps and contain no mercury or other potentially dangerous materials, therefore, providing various safety and environmental benefits.

Outdoor solar lighting fixtures come in all kinds of decorative designs. In the prior art, the solar panels are part of the particular manufacturer's model of the decorative lighting fixture.

SUMMARY OF THE INVENTION

The present invention seeks to provide a novel outdoor light pole with a solar panel array, as is described more in detail hereinbelow. In the present invention, the solar panels are mounted (e.g., vertically mounted) on the pole and the top of the pole is adapted to accept any kind of decorative light fixture.

In contrast with the prior art, in the present invention, the solar panels are not part of the particular manufacturer's model of the decorative lighting fixture. Instead the solar panels are on the pole and any decorative lighting fixture may be mounted on the pole and powered by the solar array through batteries. This has the advantage of enabling a homeowner to convert an existing light fixture to a solar powered light without having to purchase a new decorative fixture. The homeowner simply mounts the existing decorative fixture on the solar powered pole, makes the electrical connections between the light(s) and batteries, and the solar outdoor light is ready for use.

The invention can be used to replace AC lights or gas lights, which are used for outdoor lighting in many locations.

The invention significantly increases the available area for charging while at the same time conforming to the slim contour of the pole. There is no need for exterior additional panels, which are cumbersome, expensive and required support structures to support their weight.

The invention may be assembled as an add-on accessory to an existing pole. Alternatively, the pole may be manufactured with integrated panels of the invention built onto or into the pole. Both options maintain the aesthetic outline of the pole.

There is provided in accordance with an embodiment of the invention a solar energy device including an outdoor pole with a solar panel array including a plurality of solar panels mounted around a periphery of the pole, wires electrically connecting the solar sub-panels and connecting the solar panels, a base on which the pole is mounted, and a battery mounting module removably inserted in the base, the battery mounting module including a cradle for receiving therein one or more batteries.

In accordance with an embodiment of the invention each of the solar panels is divided into solar sub-panels, wherein the solar sub-panels have unequal shapes but equal areas.

In accordance with an embodiment of the invention the battery mounting module includes a mounting tab which snaps in the base.

In accordance with an embodiment of the invention the battery mounting module includes a user interface panel on a front face thereof.

BRIEF DESCRIPTION OF THE DRAWINGS

The present invention will be understood and appreciated more fully from the following detailed description taken in conjunction with the drawings in which:

FIGS. 4A, 4B and 4C are simplified pictorial illustrations of a battery mounting module for use with the pole of FIG. 1, wherein FIG. 4A illustrates the battery mounting module when empty, FIG. 4B illustrates the battery mounting module with one or more batteries placed therein and ready for insertion into the base of the pole, and FIG. 4C illustrates the battery mounting module and base mounted in the pole;

FIG. 5 is a simplified pictorial illustration of one example of a decorative light fixture mounted on the pole, in accordance with an embodiment of the present invention.

DETAILED DESCRIPTION OF EMBODIMENTS

Figure 1:
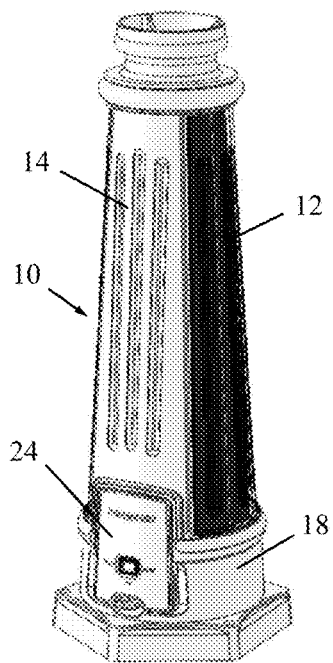
FIG. 1 is a simplified pictorial illustration of a pole with one solar panel mounted thereon, constructed and operative in accordance with an embodiment of the present invention.
Figure 2:
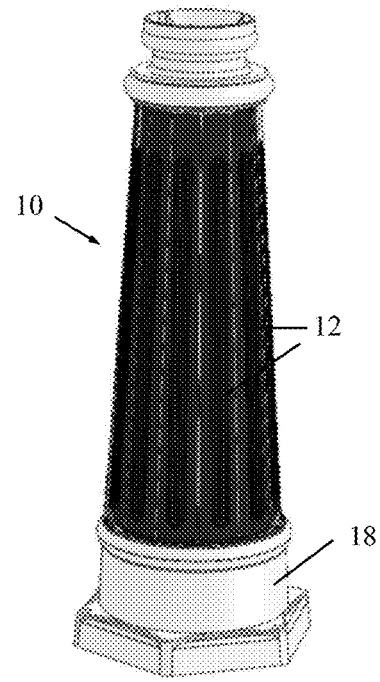
FIG. 2 is a simplified pictorial illustration of the pole of FIG. 1 with more solar panels mounted thereon to form a solar panel array.

Reference is now made to FIGS. 1 and 2, which illustrate a pole 10 for a solar panel array, constructed and operative in accordance with a non-limiting embodiment of the present invention.

Pole 10 may have a curved outer contour, such as a cone shape, for mounting thereon solar panels 12. The cone contour may be straight, concave (in which the sides of the cone curve inwards toward the vertical centerline of the cone, between the bottom and top of the cone), convex (in which the sides of the cone curve outwards away from the vertical centerline of the cone, between the bottom and top of the cone) and others. Alternatively, the pole 10 may have a non-curved outer contour, such as a polyhedron with facets or other shapes.

In the illustrated, non-limiting embodiment, there are a plurality of facets 14 (FIG. 1) around the pole periphery for mounting thereon solar panels 12. Solar panel 12 is any kind of photovoltaic cell for generating electricity from solar energy, such as but not limited to, monocrystalline, polycrystalline or amorphous film cells.

In one-to-one correspondence with the number of facets 14, say in facets, there are in solar panels 12 mounted around the perimeter of pole 10. Each solar panel 12 may include a plurality of n solar sub-panels 12(1) up to 12(n) (FIG. 2). The solar sub-panels 12(1 . . . n) may be electrically connected to one another in parallel or series according to the battery charging requirement or other requirement. The solar sub-panels 12(1 . . . n) may have unequal shapes, but the areas of all solar sub-panels 12(1 . . . n) are equal. In other words, the area of solar sub-panel 12(1)=the area of solar sub-panel 12(2)=the area of solar sub-panel 12(3)= . . . =the area of solar sub-panel 12(n). For example, the length of the lowest solar sub-panel 12(1) is longer than the length of solar sub-panel 12(2), but the width of the lowest solar sub-panel 12(1) is less than the width of solar sub-panel 12(2) so that the areas are the same. The uppermost solar sub-panel 12(n) has the smallest length and largest width (length being the horizontal dimension and width being the vertical dimension).

Wires 13 (seen partially in FIG. 2 in broken lines) electrically connect the solar sub-panels and connect the solar panels. The in solar panels 12 may be electrically connected in series or in parallel, with the wires and electrical connections being made in the inside of the pole, for example. Each solar panel 12 may be bonded to pole 10 with adhesive or joined in any other suitable manner, such as with mechanical fasteners or welding and the like. A protective cover 16 (shown broken away in FIG. 2) may be assembled over the solar panels 12 that have been fixed on pole 10. Protective cover 16 may be constructed of a strong, transparent material with good resistance to ultraviolet radiation degradation, such as but not limited to, polycarbonate. Any gaps between the solar panels 12 and the inner periphery of the protective cover 16 may be filled with a transparent filler material, such as but not limited to, a two-component polyurethane-based, epoxy-based or silicone-based material. The transparent filler material may help fix panels 12 in place, to avoid breakage, chipping, or other damage. The transparent filler material may also have good resistance to ultraviolet radiation degradation.

Figure 3A:
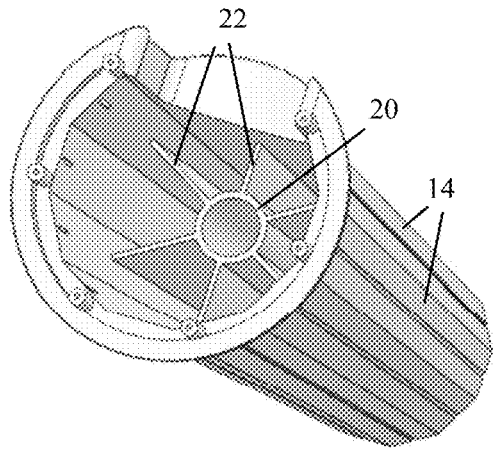
FIGS. 3A and 3B are simplified lower and upper perspective illustrations, respectively, of the inside of the pole.
Figure 3B:
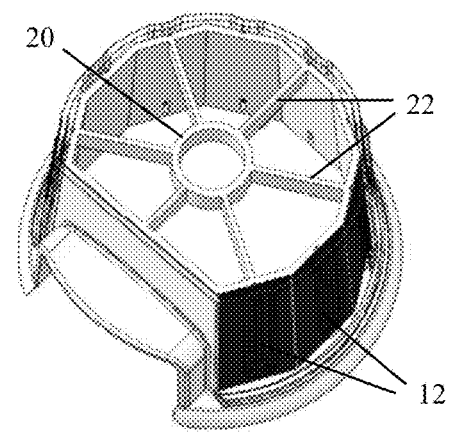

Reference is now made to FIGS. 3A-3B, which illustrate the inside of the pole 10. Pole 10 may be hollow with an inner reinforcing structure, such as a hollow cylindrical shaft 20 with radially-outwards fins 22 extending therefrom. The reinforcing structure does not just reinforce the pole; the spaces between the fins 20 and or the hollow center of shaft 20 may be used to carry wires that electrically connect the batteries to the lighting fixture.

Reference is now made to FIGS. 4A-4C, which illustrate a battery mounting module 24 for use with pole 10 of FIG. 1. As seen in FIG. 4A, the battery mounting module 24 may include a cradle 26 which has a front face 28 with an aperture 30 formed therein. A mounting tab 32 may be provided at the front of the cradle 26, which snaps over a mounting lip or other structure in the base 18 of pole 10, when the battery mounting module 24 is slid into base 18 (FIG. 4B). As seen in FIG. 4B, one or more batteries 34 with connecting leads 36 may be placed in cradle 26. Batteries 34 are rechargeable from current generated by the solar panels.

A user interface panel 38 is mounted on the front face 28 of battery mounting module 24, and may include an on-off switch, indicator lights, etc.

FIG. 4B illustrates the battery mounting module 24 with batteries 34 placed therein and ready for insertion into base 18. FIG. 4C illustrates the battery mounting module 24 and base 18 mounted in pole 10.

Reference is now made to FIG. 5, which illustrates a decorative light fixture 40 mounted on pole 10. The decorative light fixture 40 has a light 42, such as an array of LEDs, which are powered by the batteries 34 of FIG. 4B. The invention enables a homeowner to convert an existing light fixture to a solar powered light without having to purchase a new decorative fixture. The homeowner simply mounts the existing decorative light fixture (such as fixture 40) on the solar powered pole 10, makes the electrical connections between the light(s) and batteries 34, and the solar outdoor light is ready for use.

What is claimed is:

1. A solar energy device comprising:
   an outdoor pole with a solar panel array comprising a plurality of solar panels mounted around a periphery of said pole;
   wires electrically connecting said solar panels;
   a base on which said pole is mounted, and
   a battery mounting module removably inserted in said base, said battery mounting module comprising a cradle for receiving therein one or more batteries;
   wherein said pole is hollow with an inner reinforcing structure, and said inner reinforcing structure comprises a hollow cylindrical shaft with radially-outwards fins extending therefrom, and wherein other wires are disposed in spaces between said fins and/or in a hollow center of said cylindrical shaft and said other wires electrically connect said one or more batteries to a lighting fixture mounted on said outdoor pole.

2. The solar energy device according to claim 1, wherein each of said solar panels is divided into solar sub-panels, wherein said solar sub-panels have unequal shapes but equal areas.

3. The solar energy device according to claim 1, wherein said battery mounting module comprises a mounting tab which snaps in said base.

4. The solar energy device according to claim 1, wherein said battery mounting module comprises a user interface panel on a front face thereof.

5. The solar energy device according to claim 1, wherein said pole has a curved outer contour.

6. The solar energy device according to claim 1, wherein said pole has a cone shape.

7. The solar energy device according to claim 1, wherein facets are formed around the periphery of said pole for mounting thereon said solar panels.

8. A method of using the solar energy device according to claim 1, comprising converting an existing decorative light fixture to a solar powered light by mounting the existing decorative fixture on said pole, and making electrical connections between one or more lights and one or more batteries placed in said battery mounting module.

* * * * *